(12) United States Patent
Mitcham (10) Patent No.: US 7,474,030 B2
(45) Date of Patent: Jan. 6, 2009

(54) MAGNETIC COILS FOR ELECTRICAL MACHINES

(75) Inventor: Alan J Mitcham, Ponteland (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 11/593,115

(22) Filed: Nov. 6, 2006

(65) Prior Publication Data

US 2007/0052316 A1    Mar. 8, 2007

Related U.S. Application Data

(62) Division of application No. 10/921,152, filed on Aug. 19, 2004, now Pat. No. 7,265,472.

(51) Int. Cl.
*H02K 17/00*    (2006.01)

(52) U.S. Cl. .................................................. 310/208
(58) Field of Classification Search .......... 310/201–208
See application file for complete search history.

(56) References Cited

U.S. PATENT DOCUMENTS

| 6,501,205 B1 * | 12/2002 | Asao et al. ................... 310/184 |
| 2002/0057031 A1 * | 5/2002 | Ueda et al. ................... 310/208 |

* cited by examiner

*Primary Examiner*—Nguyen N Hanh
(74) *Attorney, Agent, or Firm*—W. Warren Taltavull; Manelli Denison & Selter PLLC (57) ABSTRACT

A magnetic coil 32 for an electrical machine is constructed from two sub-conductors 34A, 34B, each in the form of laminae of conducting material such as copper sheet, coated with an insulating material. At one end of the coil, the sub-conductors extend by different distances, to provide space at 39 for a transposition of the sub-conductors.

4 Claims, 6 Drawing Sheets

MAGNETIC COILS FOR ELECTRICAL MACHINES

This application is a Divisional Application of National application Ser. No. 10/921,152 filed Aug. 19, 2004 now U.S. Pat. No. 7,265,472.

FIELD OF THE INVENTION

The present invention relates to magnetic coils for electrical machines.

BACKGROUND OF THE INVENTION

Permanent magnet electrical machines are advantageous for use in applications where high torque (when used as a motor) or high power (when used as a generator) are required, but the machine is also required to be small, light and to have high efficiency. Applications for such machines include land vehicles, aircraft, water-borne vessels and fixed industrial applications.

Permanent magnet electrical machines have a ring of permanent magnets and a ring of magnetic coils (often called windings), usually disposed within slots in an armature of low permeability material, such as laminated iron. The magnetic coils commonly form a ring on a stator around a rotor which carries the permanent magnets, but other arrangements are possible. Turning the rotor relative to the stator creates currents in the coils, allowing the electrical machine to be used as a generator. Conversely, alternating current can be applied to the coils to cause the rotor to turn, allowing the electrical machine to be used as a motor.

Electrical machines of this type commonly have a large number of permanent magnets and coils and this leads to high frequency losses connected with the coils, particularly relating to eddy currents within the coils.

SUMMARY OF THE INVENTION

The present invention provides a magnetic coil for an electrical machine which includes an armature having slots for receiving a magnetic coil, the coil having turns provided by at least two sub-conductors, each sub-conductor having slot portions which, in use, are located within the armature slots of an electrical machine, and connecting portions which, in use, are located outside the armature slots to provide connections between the slot portions at the ends of the coil, the connecting portions of at least one end of the coil extending by different distances from the slot portions to provide space for a connecting portion of one sub-conductor to extend past a connecting portion of another sub-conductor in order to change the order of the sub-conductors along the coil.

Preferably the connecting portions are arranged to provide transposition of the order of sub-conductors. The connecting portions are preferably arranged as aforesaid at both ends of the coil, to provide for changing the order of sub-conductors at both ends.

Each sub-conductor may be in the form of a complete sub-conductor coil having slot portions connected at both ends by connecting portions, the turns of each sub-conductor coil being brought together with the turns interleaved.

The magnetic coil preferably consists of two sub-conductors. The slot portions of the coil may be formed to have parallel faces defined by the slot portions, to allow the coil to be located within a pair of parallel sided slots formed within an armature.

The invention also provides an electrical machine which includes an armature having sots for receiving a magnetic coil, and at least one magnetic coil located in the slots and having turns provided by at least two sub-conductors, each sub-conductor having slot portions which are located within the armature slots, and connecting portions which, in use, are located outside the armature sots to provide connections between the slot portions at the ends of the coil, the connecting portions of at least one end of the coil extending by different distances from one slot portions to provide space for a connecting portion of one sub-conductor to extend past a connecting portion of another sub-conductor in order to change the order of the sub-conductors along the coil.

Each magnetic coil of the machine may have any feature or combination of features of the magnetic coil set out above in connection with the first aspect of the invention.

Preferably the or each magnetic coil is located in a pair of armature slots, the slot walls of the pair of slots being substantially parallel. The sub-conductors preferably fill the armature slots substantially without gaps between sub-conductors or between turns of the coil.

BRIEF DESCRIPTION OF THE DRAWINGS

Embodiments of the present invention will now be described in more detail, by way of example only, and with reference to the accompanying drawings, in which.

DETAILED DESCRIPTION OF THE INVENTION

Figure 1:
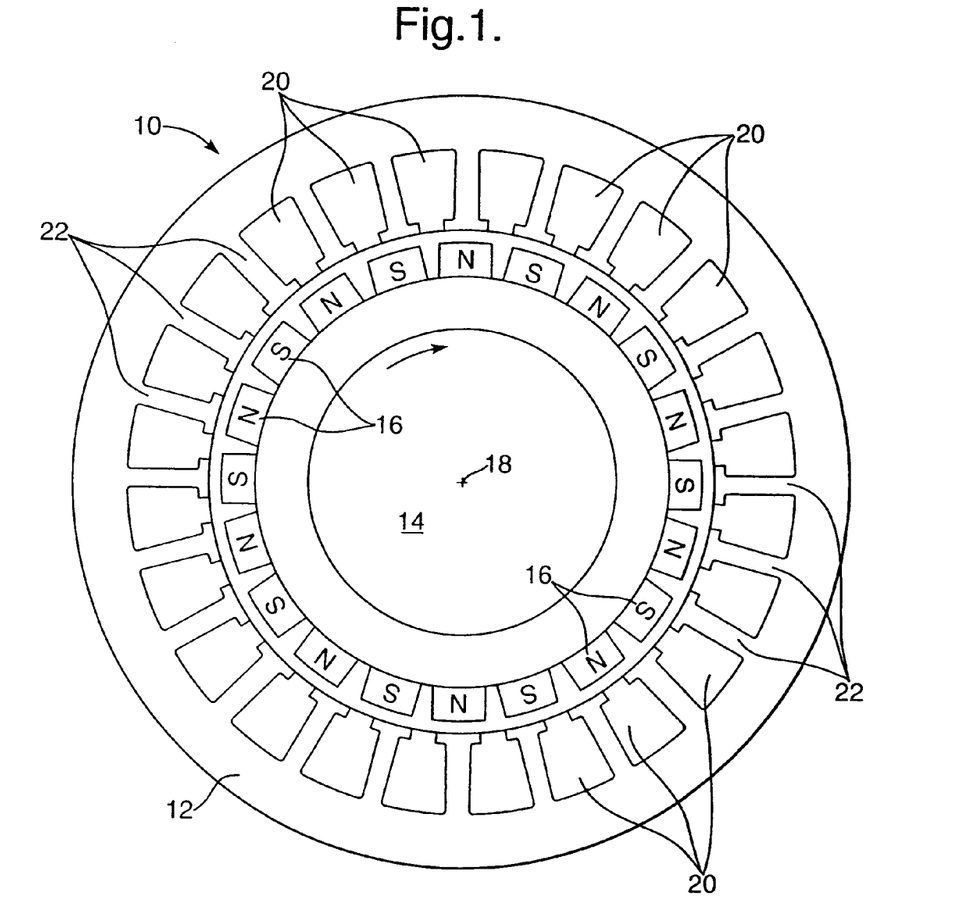
FIG. 1 is a cross-section through a typical multi-phase permanent magnet electrical machine of the type to which the present invention relates.

FIG. 1 is a cross-section through a permanent magnet electrical machine 10 which has a stator 12 around a rotor 14. The rotor 14 carries a ring of permanent magnets 16 magnetised in a generally radial direction and alternating in polarity, so that the rotor 14 provides an alternating ring of north and south magnetic poles, indicated in FIG. 1 by the letters N and S. In this example, a total of twenty poles are provided around the rotor 14. The rotor is mounted by means of appropriate bearings to turn about the axis 18.

The stator 12 (or armature) has a ring of slots 20 formed therein, separated by teeth 22. Each pair of adjacent slots 20 accommodate a winding in the form of a coil (not shown). Each coil is located around the tooth 22 which separates the slots 20. The next pair of slots 20 accommodate another coil, and so on around the stator 12. Thus, there are coils around alternate teeth around the armature. Accordingly, a stator having twenty four slots, as shown in FIG. 1, will accommodate twelve coils. These can be divided into three groups of four coils to provide three electrical phases.

In this geometry, the coil axis is disposed along the tooth 22, radially from the axis 18 of the machine 10. References to the length of the coil, and the length of the slot are used herein to refer to the dimension parallel to the machine axis 18.

FIG. 1 shows the arrangement in which the stator 12 (and the associated coils) are stationary and located outside the permanent magnets of the rotor 14. However, the principles which will now be described can be applied also to machines with the permanent magnet system outside the magnetic coils, and to machines in which the magnetic coils rotate cast fixed permanent magnets.

In many practical applications, a machine of the type illustrated in FIG. 1 may be operated at a rotational speed of 6000 rpm or higher, giving rise to an output frequency in excess of 1000 Hz. Such high frequencies give rise to significant high frequency AC losses in the coils. The examples to be set out below seek to obviate or mitigate these losses.

Figure 2:
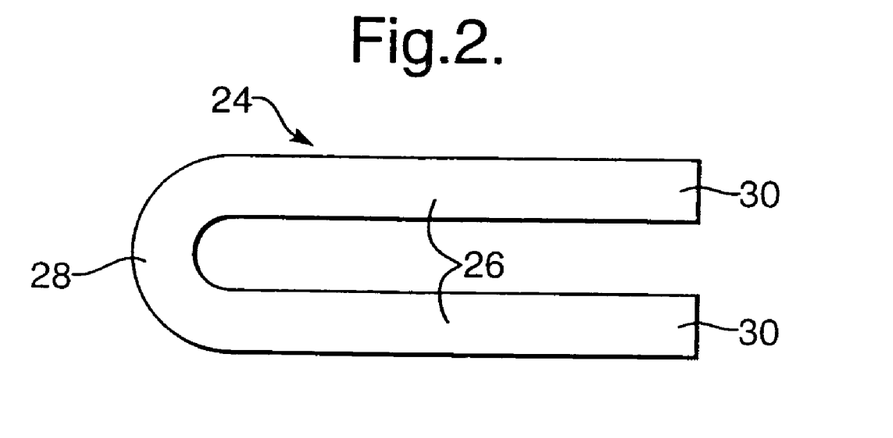
FIG. 2 is a plan view of a conducting element for use in constructing a magnetic coil according to the present invention.

FIG. 2 shows a conducting element 24 for use in constructing a magnetic coil according to the present invention. The element 24 is formed from sheet material, such as copper sheet, by cutting, stamping, punching, laser cutting or the like, to form the element 24 with two substantially parallel elongate limbs 26 connected at one end by a web 28 to leave two ends 30 free. Having been formed from sheet, the element 24 is in the form of an elongate U-shaped lamina. For example, each limb 26 may be 100 mm in length, 15 mm in width, and 1.5 mm in thickness. The planes of the limbs 26 will be substantially parallel or coincident. The element 24 is coated in electrically insulating material, for reasons which will become apparent. The material may be ceramic-based. It is desirable to form the coils from U-shaped elongate laminae as shown in FIG. 2, but limbs 26 could be individually formed, without the interconnecting web 28.

Elements 24 can be used to form coils in a number of different geometries, three of which will now be described in more detail.

Figure 3:
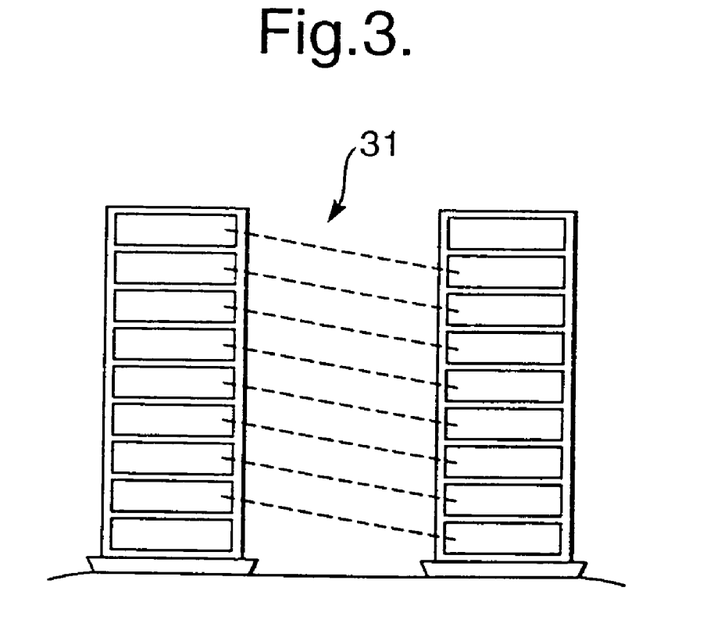
FIG. 3 is a partial cross-section showing a coil within armature slots.

A first coil is illustrated in FIG. 3 and is a simple cool in the form of a flattened spiral formed from a stack of U-shaped elements 24, all being aligned when viewed radially toward the machine axis. Description of this coil is helpful in establishing the basic geometry of the arrangements to be described later.

At one end of the coil, the limbs 26 are connected to the corresponding limb on the other side of the coil by the corresponding web 28, these limbs 26 being at the same level in the coil, to form one turn of the coil. At the other end of the coil, each limb 26 is connected with a limb 26 at the other side of the coil, but at a level above or below, as indicated by broken lines 31, indicating links formed by appropriate connecting wires, bars or the like. This forms a coil providing a single path for electrical current. The coil is thus in the form of a flattened helix. The limbs 26 form straight portions located within the armature slots and interconnected at the ends of the coil, either by the webs 28, or other connecting portions such as wires, bars etc.

This construction allows a number of arrangements to be made to reduce AC losses, as follows. The elements 24 can be stacked closely, or abutted (by virtue of the electrically insulating layer they carry, such as a ceramic material). This achieves a high packing density for turns of the coil. In addition, the conductors are not broken in the direction tangential to the machine axis (across the width of the limbs 26), with consequent thermal advantages, providing higher thermal coupling to the armature 12. Improving the thermal coupling allows higher currents to be used, and increasing the packing density allows a higher current density to be used and, with the increased packing density, results in a generator with higher power density (i.e. smaller size for an equivalent power or a motor with higher torque density (higher torque for a given size).

Furthermore, it can be seen that the coil has been formed from the sheet elements 24, substantially without any deforming of the elements 24. The limbs 26 of a particular element 24 remain generally co-planar in particular, the elements 24 are not exposed to the distortion of winding onto a former or directly onto a tooth 22. Consequently, the choice of insulating material for the elements 24 is not limited to those which can survive the distortion of winding. In particular, this allows ceramic-based insulating materials to be used. These have high temperature tolerances (allowing the machine to be used in harsher environments), good thermal conductivity (allowing improved heat dispersion and temperature control within the machine) and high electrical insulation properties (allowing relatively thin films of light weight to be used). These factors all result in improved machine weight, compactness and efficiency and could not be achieved by using a coil formed from pre-insulated copper conductor, by virtue of the non-flexible nature of ceramic-based insulation materials.

In addition, AC losses are reduced by the use of lamina elements. AC losses in a coil for an electrical machine can be shown to depend on the fourth power of the height (along the radial direction from the machine axis 18) of the coil conductors. According to the invention, the lamina conductors can be thin (less than 2 mm) according to the thickness of the sheet from which they are formed.

The coil could be made as a continuous copper coil machined from solid material, thereby avoiding joints being required at the coil ends. Alternatively the strip could be wound, if the aspect ratio is not too severe.

The example of FIG. 3 provides only a single path for electrical current, as has been described. Further reductions in AC losses can be achieved by using sub-conductors in each turn, i.e. providing more than one electrical current path through the coil, these paths being connected to be electrically parallel to each other. Two examples of arrangements of this nature can now be described.

Figure 4:
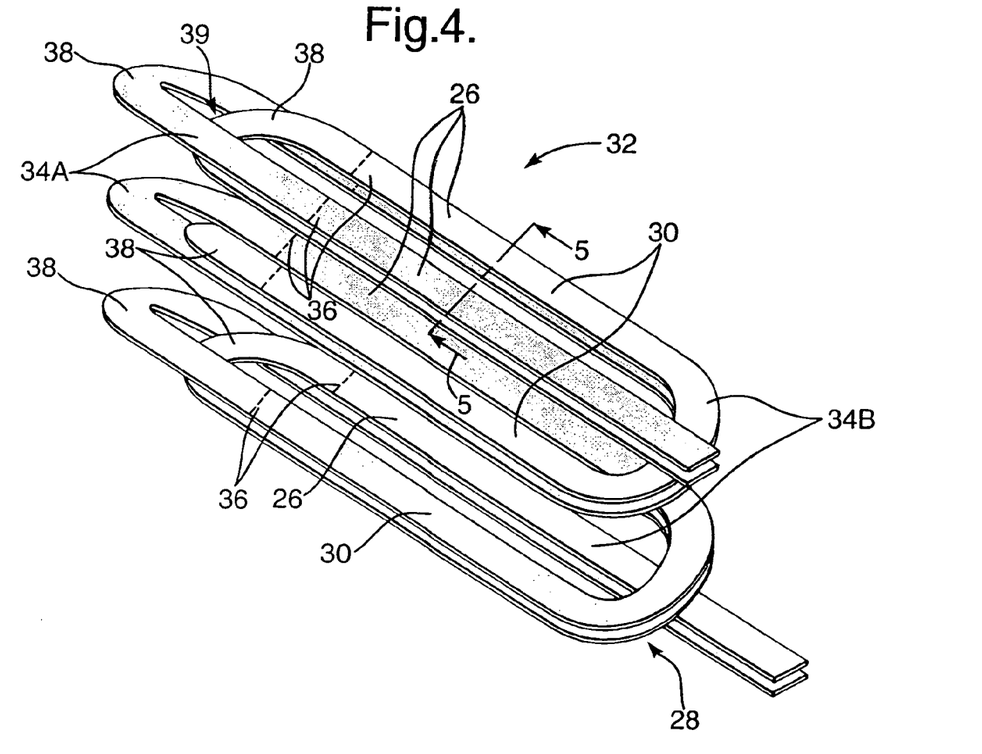
FIG. 4 is a perspective view of a first coil formed in accordance with the present invention and shown in isolation.

FIG. 4 shows a magnetic coil 32 whose turns are provided by two sub-conductors 34A, 34B. Sub-conductor 34A is shown shaded in FIG. 4. Each sub-conductor 34 is forced from several elements 24, as shown in FIG. 2, with the ends 30 of adjacent elements 24 connected together by short U-shaped connections as indicated by broken lines at 36 to identify the position of joints between the ends 30 and the connecting members 38.

Looking at one or other sub-conductor 34, it can be seen that each turn of each sub-conductor includes two straight portions which will be located within armature slots and are thus here called slot portions. These are provided by the length of the limbs 26, which will extend generally parallel with the machine axis 18, when installed in machine slots. These slot portions are connected by means of connecting portions located outside the armature slots, at either end, to provide connections between the slot portions. These connections are at the ends of the coil and are provided either by the webs 28 or the connecting members 38. In this example, the webs 28 are all approximately on alignment when viewed radially toward the machine axis 28. However, the connecting members 38 are not in radial alignment. The connection members 38 which form part of the sub-conductor 34A extend further from the slot portions 26, than the members 38 connecting the other sub-conductor 34B. This extra distance by which the sub-conductor 34A extends, provides a space (indicated generally at 39 in FIG. 4) within the curve of the corresponding connecting member 38, within which the connecting member of the sub-conductor 34B may pass above the connecting member of the sub-conductor 34A. This allows the order of sub-conductors to be transposed so that, as can be seen from FIG. 4, whereas the sub-conductor 34A is uppermost at the nearest side of the upper turn of the coil, as viewed in FIG. 4, it is the sub-conductor 34B which is uppermost at the far side of the upper turn, by virtue of the transposition which has taken place at the space 39 at the far end of the coil.

No transposition takes place at the near end of the coil and consequently, the second turn begins with the sub-conductor 34B uppermost, but a further transition takes place at the far end of the coil, so that the second turn finishes with the sub-conductor 34A again uppermost. These transpositions continue at each turn of the coil.

Figure 5:
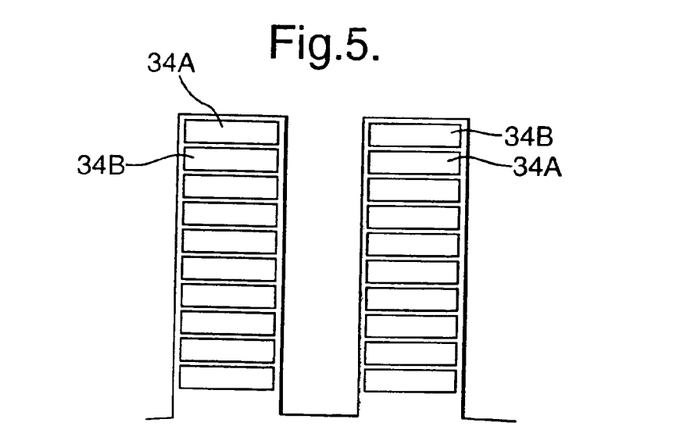
FIG. 5 is a partial and partly schematic cross-section through an armature having slots which accommodate the coil of FIG. 4, the section being taken mid-way along- the coil of FIG. 4.

The transpositions can be seen in FIG. 5, which is a section along the line 5-5 of FIG. 4, showing the coil 32 in position in an armature. The sub-conductor 31A is shown shaded on FIG. 5. As can clearly be seen in FIG. 5, the slot portions 26 of the first turn have the sub-conductor 34A uppermost at the right and lowermost at the left, whereas the second turn 42 has the sub-conductor 34B uppermost at the right and lowermost at the left, by virtue of the transposition which has taken place at the far end of the coil (as viewed in FIG. 4).

This transposition can be readily achieved by extending the sub-conductors beyond the ends of the slot and providing space for transposition in the manner described above. In effect, extending beyond the ends of the slots allows the design to make use of a third dimension (parallel to the machine axis 18) in addition to the radial and tangential dimensions, relative to the machine axis. Thus, complete transposition can be achieved at a single location. Reduced losses within the coil can be achieved by the use of sub-conductor paths, but these advantages are enhanced by the use of transposition of the sub-conductors. In the arrangement illustrated in FIG. 4, transposition is possible, with its associated advantages, while still allowing the slot portions to pass undeflected along the whole length of the sot. This in turn ensures that the slot may be fully packed (i.e. substantially without any gaps between sub-conductors or turns), and allows each sub-conductor to extend across the full width of the slot, with improved thermal advantages as described above.

An alternative coil design is illustrated in FIGS. 6 to 9. This design retains some similarities to the coil of FIG. 4. In particular, it has slot portions which are straight along the length of the slot, in order to provide a high packing density, and are provided with arrangements for transposing the sub-conductors, beyond the ends of the slots.

Figure 6:
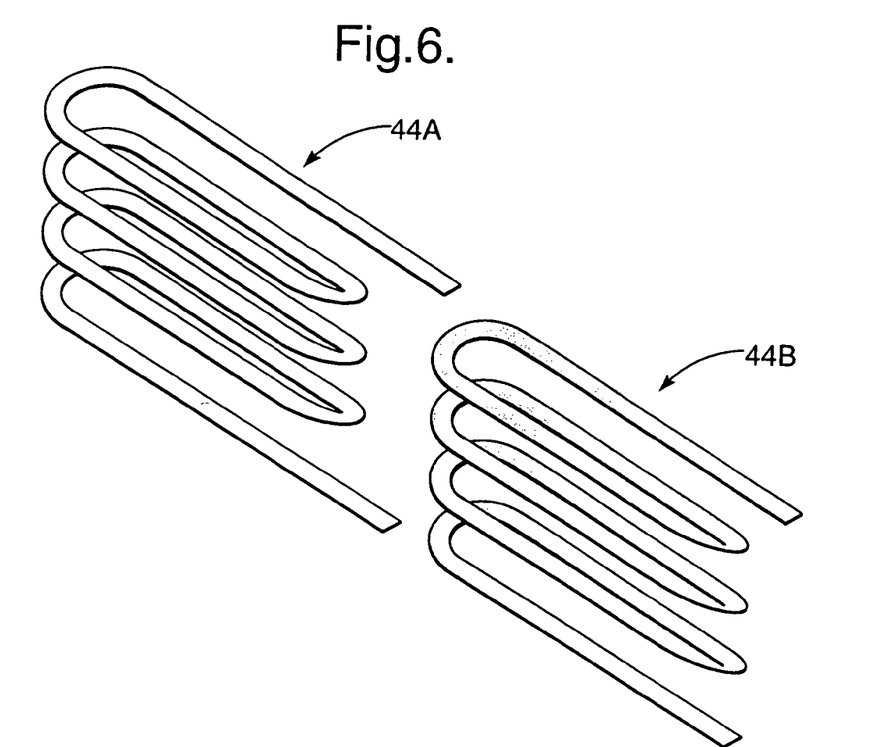
FIGS. 6, 7 and 8 are perspective views of the components, method of assembly and final arrangement of an alternative coil according to the present invention.

In more detail, FIG. 6 shows two sub-conductor coils 44A, 44B, the latter being shaded for clarity. Each sub-conductor coil 44 is substantially the same end is made from a series of elements 24 the ends 30 of which are connected by short U-shaped connecting members to form a flattened spiral. Alternatively, the flattened spiral could be machined from a single block of appropriate material. The two spirals turn in the same sense, or "handedness". Each sub-conductor coil 44 will be covered with an appropriate insulating material, for example one of the materials discussed above.

Figure 7:
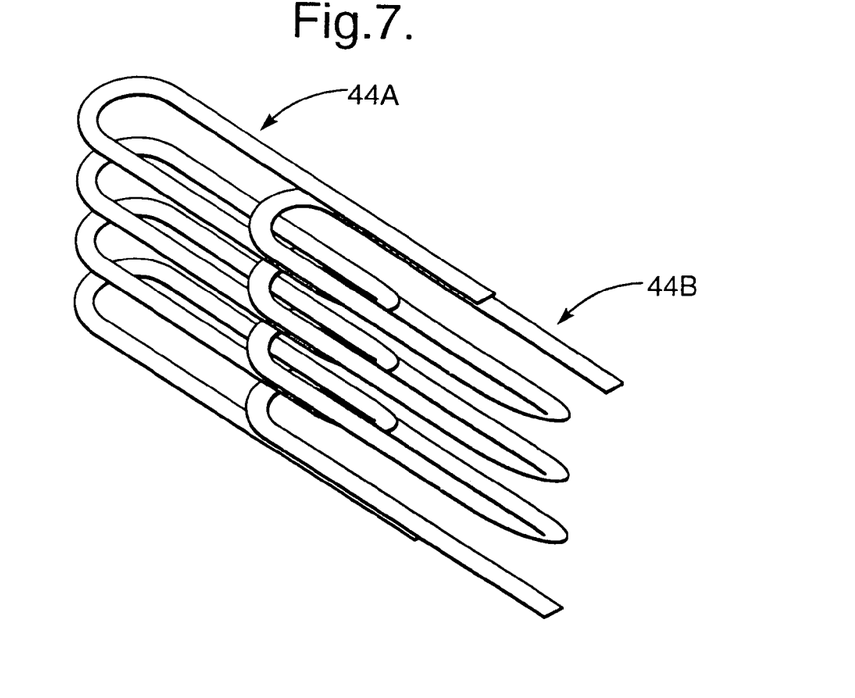

The sub-conductor coils 44 can be brought together, as shown in FIG. 7, to interleave the turns of one coil 44 between adjacent turns of the other coil 44. As the coils 44 are interleaved, it is to be noted that at each turn, the coil 44A is uppermost at the far side (as viewed in FIG. 7), but the coil 44B is uppermost at the near side.

Figure 8:
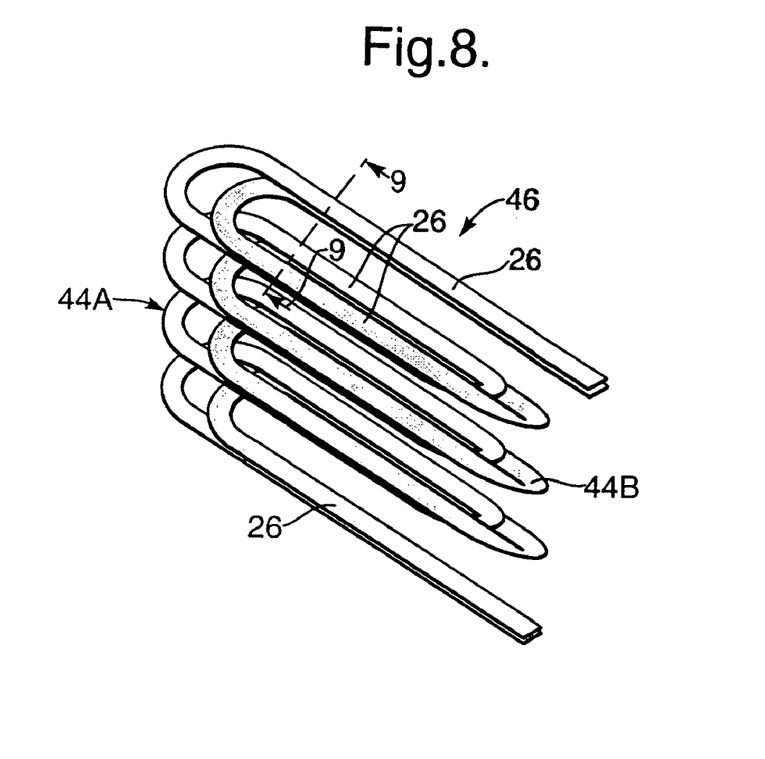
Figure 9:
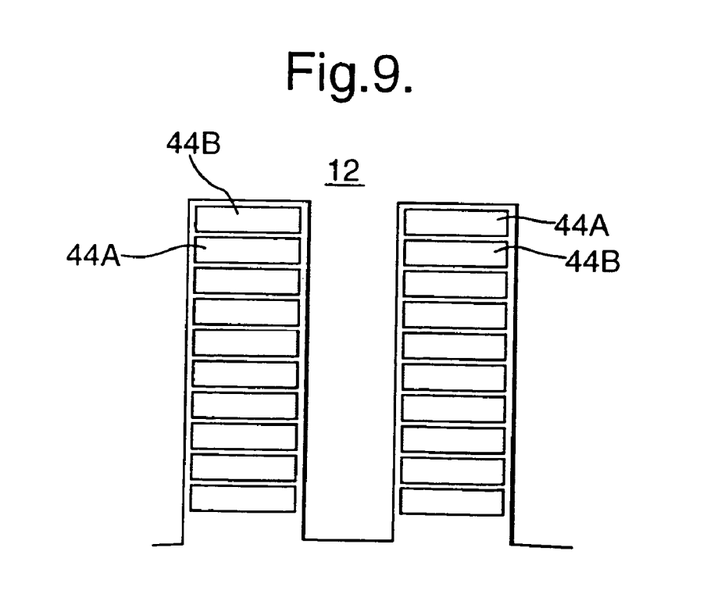
FIG. 9 is equivalent to FIG. 5, showing the coil of FIG. 8.

The coils 44 continue to be moved together in this manner until the position of FIG. 8 is reached. This has formed a coil 46 which has two sub-conductor paths formed by the coils 44, and other advantageous geometry as can now he described with reference to FIGS. 8 and 9.

It can be seen from FIG. 8 that between the ends of the coil 46, both sub-conductor coils 44 have straight slot portions 26 which, in use, will be located within the armature slots of the electrical machine. The slot portions 26 extend straight along the whole length of the slot, in similar manner to the slot portions described above in relation to FIG. 4 and FIG. 5. However, in the coil 46, arrangements for transposition of the sub-conductors are made at both ends of the coil 46. Thus, at the far end of the coil 46, it can readily be seen that the sub-conductor 44A extends further from the slot portions 26 than the coil 44B, thus providing space for the coil 44B to pass above the coil 44A and create a transposition of the order of the coils 44, as between the near and far sides of the coil 46. This transposition is similar to the transposition provided at 39 in the coil of FIG. 4. Similarly, at the near end of the coil 46, the coil 44B extends further beyond the slot portions 26 than does the coil 44A, again providing space for a transposition to take place, with the coil 44A passing above the coil 44B. Consequently, as can be seen from FIG. 8 and readily from FIG. 9 a view of Fig. at the line 9-9, with the coil in position in a stator 12), the first turn 48 has the coil 44A uppermost at the right and lowermost at the left. The second turn 50 again has the coil 44A uppermost at the right and lowermost at the left. This arises because transposition is occurring at both ends of the coil 46, that is, there are two transpositions in each turn of the coil 46.

The embodiments described above, beginning with FIG. 4, have two sub-conductors forming a coil. A greater number of sub-conductors could be provided. For example, groups of three or more elements 3 could be used to form each turn of a coil. Each could have a connecting portion in the form of a web 28 extending for a different distance from the slot portions, so that various changes in the order of the sub-conductors could be produced from turn to turn.

Figure 10:
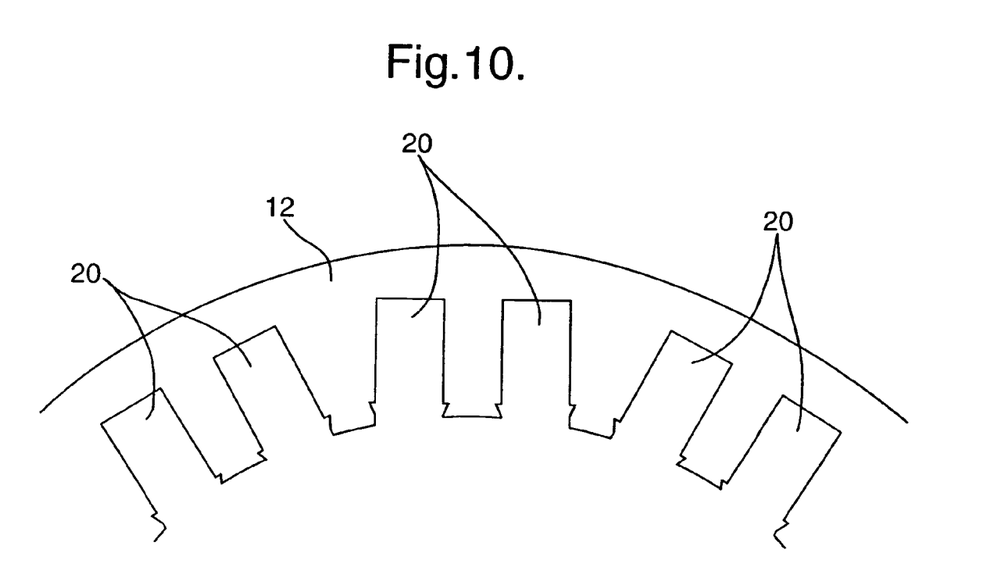
FIG. 10 is a partial cross-section of an armature for use in an electrical machine according to the present invention.

A particular advantage of the arrangements described above is that the boils can be constructed as a separate module to be fitted to the stator 12 which is, in turn, manufactured as a module. Indeed, the sub-conductors can be made as modules and interleaved, as noted above. This modularity allows improved manufacturing ease, consistency and quality control. Fitting of the coils as modular items is facilitated by the construction of the stator 12 to have neighbouring slots as illustrated in FIG. 10. FIG. 10 shows three pairs of coil slots 20, for receiving respective coils. It can be seen from FIG. 10 that each pair of slots 20 (which are open rather than partially closed as in FIG. 1) have their four sides parallel with each other. A completed coil of the type shown in FIG. 4 or FIG. 8 can therefore be introduced into the slots 20, prior to installation ci the rotor 14, by placing the coil over the tooth 22, separating the pair of slots 20. This is facilitated because the slot portions of the members forming the coil together provide parallel faces alongside the coil.

It is envisaged that many variations and modifications can be made to the examples described above, particularly in relation to materials, shapes, dimensions and relative dimensions.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A magnetic coil for an electrical machine including armature slots and two sub-conductor coils comprising a plurality of flat conductive elements with each conductive element including a plurality of pairs of parallel extending arms connected by U-shaped members, each said arm of said pair being unbent and co-planar, said sub-conductor coils being stacked forming a single said magnetic coil including two sub-conductor paths wherein said magnetic coil being in the geometric shape of a flattened helix and formed from sheet elements with said sheet elements being free of any deformation.

2. A magnetic coil as claimed in claim 1 wherein each sub-conductor coil is covered with an insulating material.

3. A magnetic coil as claimed in claim 1 wherein each sub-conductor coil includes a straight slot portion being straight along the entire length of said slot and being located within its corresponding armature slot of the electrical machine.

4. A magnetic coil as claimed in claim 1 wherein said two sub-conductor coils are interleaved.

* * * * *